United States Patent [19]

Schwarz

[11] Patent Number: 4,643,591
[45] Date of Patent: Feb. 17, 1987

[54] ADJUSTABLE GUIDE FOR RELATIVELY MOVEABLE PARTS, PARTICULARLY OF MACHINE TOOLS

[75] Inventor: Walter Schwarz, Pfronten, Fed. Rep. of Germany

[73] Assignee: MAHO Werkzeugaschinenbau Babel & Company, Pfronten, Fed. Rep. of Germany

[21] Appl. No.: 782,208

[22] Filed: Sep. 30, 1985

[30] Foreign Application Priority Data

Oct. 17, 1984 [DE] Fed. Rep. of Germany ....... 3438059

[51] Int. Cl.$^4$ .............................................. F16C 29/06
[52] U.S. Cl. ......................................... 384/44; 384/57
[58] Field of Search ............... 308/6 C, 6 R, 3 A, 3.8; 164/168; 384/44, 57

[56] References Cited

U.S. PATENT DOCUMENTS 4,184,719 1/1980 Ward ................................. 308/3 A
4,486,054 12/1984 Oetjen et al. ...................... 308/6 C
4,550,955 11/1985 Grabher et al. .................... 308/6 C

*Primary Examiner*—Lenard A. Footland
*Attorney, Agent, or Firm*—Lahive & Cockfield

[57] ABSTRACT

The subject of the invention is an adjustable guide for machine parts of machine tools with guide shoes (15) in which provision is made for circulation of roller bodies (18) in combination with a sliding surface (17). Each guide shoe has pre-stressing and adjusting means (23) acting multiaxially. In order to avoid refinishing the guides that are secured to the fixed machine part (1), according to the invention guide rails (3) with fine-machined sliding surfaces (5, 6) are provided on the moveable machine part (2). Stands (7 to 10), having in their facing sides at least one cut-out (14) whose form corresponds to that of the guide rails (3, 4), are rigidly secured to the fixed machine part (1). One of the guide shoes (15) and its adjusting means is arranged in each cut-out side surface.

5 Claims, 5 Drawing Figures

(A-B)

ADJUSTABLE GUIDE FOR RELATIVELY MOVEABLE PARTS, PARTICULARLY OF MACHINE TOOLS

TECHNICAL FIELD OF THE INVENTION

The invention relates to an adjustable guide for relatively moveable parts, particularly of machine tools, having guide shoes which have circulating roller bodies in combination with a sliding surface and which are held in the moving machine part by prestressing and adjusting means acting multi-axially.

BRIEF DESCRIPTION OF THE PRIOR ART

The essential advantage of guides formed in this way lies in the automatic positional adaptation of the sliding surface of the guide shoe containing the roller bodies to the passing fine-machined guide surface of the respective other machine part and, in addition, in the distribution of the frictional forces into sliding friction and rolling friction, said distribution being dependent upon the pre-stress and the loads to be taken up.

Considerable problems can arise in the case of linear guides of machine parts, such as rests, tables and spindle heads, when it is discovered during acceptance tests or during operation that the guide rails that are rigidly secured to the fixed machine part, for example on the support or on the bed, are not precisely aligned to each other and/or to the vertical or to the horizontal. The resulting guiding errors cannot be eliminated by machining just the sliding or guide surfaces of the guide elements of the moveable machine part. Rather, the guide rails, which may for example be welded on, must be demounted from the fixed machine part so that they can be refinished separately on appropriate machines. Particularly when these errors are only detected during final inspection or during operation, a plurality of units and component parts must be demounted before the guide rails can be detached from the support or bed.

Attempts have already been made to solve this problem by means of adjusting wedges which are installed at certain points between the fixed machine part and the rear surfaces of the guide rails. These adjusting wedges do, it is true, enable the guide rails to be advanced in one axial direction, with adjustment of the pre-stress, but automatic positional adaptation of the cooperating plane sliding surfaces of the two guide elements is not possible. Hence in many cases it is still necessary to demount the guide rails from the fixed machine part and to rectify them separately, for example, by regrinding them, which requires the extensive work mentioned above.

OBJECT OF THE INVENTION

The object of the invention is to provide a guide for the relatively moveable parts of, more particularly, machine tools, by means of which the expensive demounting of the guide rails is avoided and which guarantees, even with differing operating conditions, very precise movement and positioning of the moveable machine part.

SUMMARY OF THE INVENTION

This object is achieved, according to the invention, by forming the fine-machined guide surfaces on the moveable machine part and by providing in the corresponding countersurfaces of the fixed machine part at least two automatically aligning guide shoes with the adjusting means.

With the guide design according to the invention, the fixed guide elements no longer have to be demounted at great operational expense when guiding errors are detected. It is merely necessary to adjust the guide shoes appropriately with the aid of the externally accessible adjusting screws whereby, in contrast to all other known wedge adjustments, according to the invention the guide surface of each sliding shoe is automatically adapted to the course or to the position of the guide surface of the moveable machine part.

According to an advantageous embodiment of the invention, two guide surfaces, inclined towards each other, are arranged on each side of the moveable machine part (prismatic guide) and at least two stands, each with a prismatic cut-out in their sides facing each other, are rigidly secured on each side of the fixed machine part, an adjustable guide shoe being arranged in each of the two prism surfaces of each stand. The provision of stands of this kind on the machine support as guide elements simplifies the task of alignment. The stands on each side can be braced with each other. The prismatic guide, in conjunction with the sliding shoes arranged in the stands, permits particularly simple and precise adjustment of the pre-stress.

According to a further advantageous embodiment of the invention, an elastic member is provided in the straight-line section of the roller body circulation track, against which the roller bodies in this section are supported. Controlled elastic support of the roller bodies in the straight-line section of track can also be achieved by including a recess, extending parallel to the straight-line section of track, inside the guide shoe. As a result there is formed in the guide shoe a supporting cross-piece whose inherent elasticity—depending upon its wall thickness—makes possible the controlled elastic support of the roller bodies located in the straight-line section of track.

The guide according to the invention can also be used for circulating and rotating machine parts such as, for example, turntables, spindles and the like. More particularly, several sliding shoes can be arranged on a circular arc in order to support a workpiece turntable, in which case the adjustability of the sliding shoes makes precise alignment of the turntable possible, and the combined rolling and sliding friction, depending on the workpiece loads and machining forces, results in excellent damping during machining of the workpiece by cutting. It is also possible to construct a prismatic guide for a turntable of this kind by using, for example, three or more sliding shoes, each arranged in a stand rigidly secured to the table base, per conical guide surface of the turntable. Also with this construction of the guide and mounting of rotationally driven machine parts, there is the important advantage that there are no passing guide surfaces on the fixed machine part which need to be refinished according to circumstances, but that a high degree of guiding precision is achieved through the possibility of adjustment and through the automatic positional adaptation of the sliding shoes used.

BRIEF DESCRIPTION OF THE DRAWINGS

Exemplary embodiments of the invention are described in detail in the following with reference to the drawings, in which.

DETAILED DESCRIPTION OF THE PREFERRED EMBODIMENTS OF THE INVENTION

Figure 1:
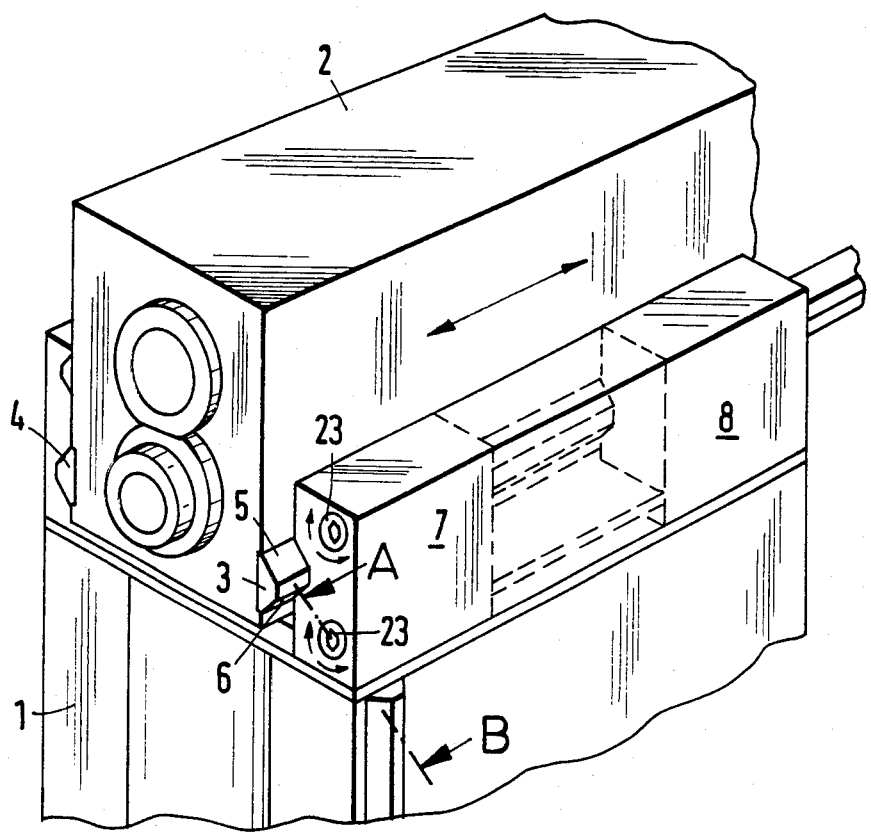
FIG. 1 shows diagrammatically a perspective view of the upper portion of a milling machine.

According to FIG. 1, the spindle head 2 is arranged on the upper surface of a support 1 so that it may be moved in the direction of the double arrow. On each longitudinal side of the spindle head 2 there is secured a prismatic guide rail 3, 4. Each guide rail 3, 4 has an upper and a lower guide surface 5, 6 which are inclined towards each other at the same angle.

On each side of the moveable spindle head 2 two stands, 7, 8 and 9, 10 respectively, are rigidly secured opposite each other on the support 1, for example by welding, and are supported in respect of each other by means of an additional plate 11. For further stiffening, the stands 7, 8 or 9, 10 on each side can be connected with each other by means of intermediate pieces 12, 13. A cut-out 14, whose prismatic form corresponds to that of the guide rails 3, is formed in the facing sides of each stand. As shown more particularly in FIG. 3, each stand has arranged in it two guide shoes 15, 16, whose sliding surfaces 17, with the roller bodies 18, extend in the side surfaces of the cut-out and cooperate with the oblique guide surfaces 5, 6 of the respective spindle head guide rails 3, 4. As is clear from FIG. 2, each guide shoe is accommodated moveably in a recess in the given stand 7 to 10 and is supported with its rearward, partly cylindrical, surface against a correspondingly formed countersurface of a wedge 20 which is supported against axial displacement in a corresponding recess in the stand, by means of a thrust piece 21. Resting against the inclined surface of the wedge 20 there is a cylindrical shaft 22 which has an oblique countersurface and which can be displaced axially by means of an externally accessible adjusting screw 23 in order to advance the sliding shoe through the action of the wedge in the direction of the guide surface of the corresponding guide rail.

Figure 2:
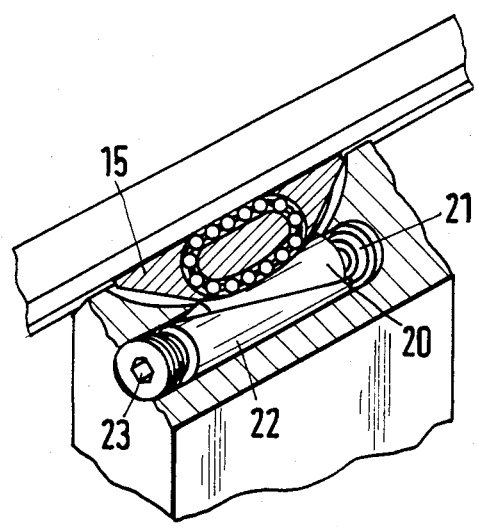
FIG. 2 shows the section A-B in FIG. 1.
Figure 3:
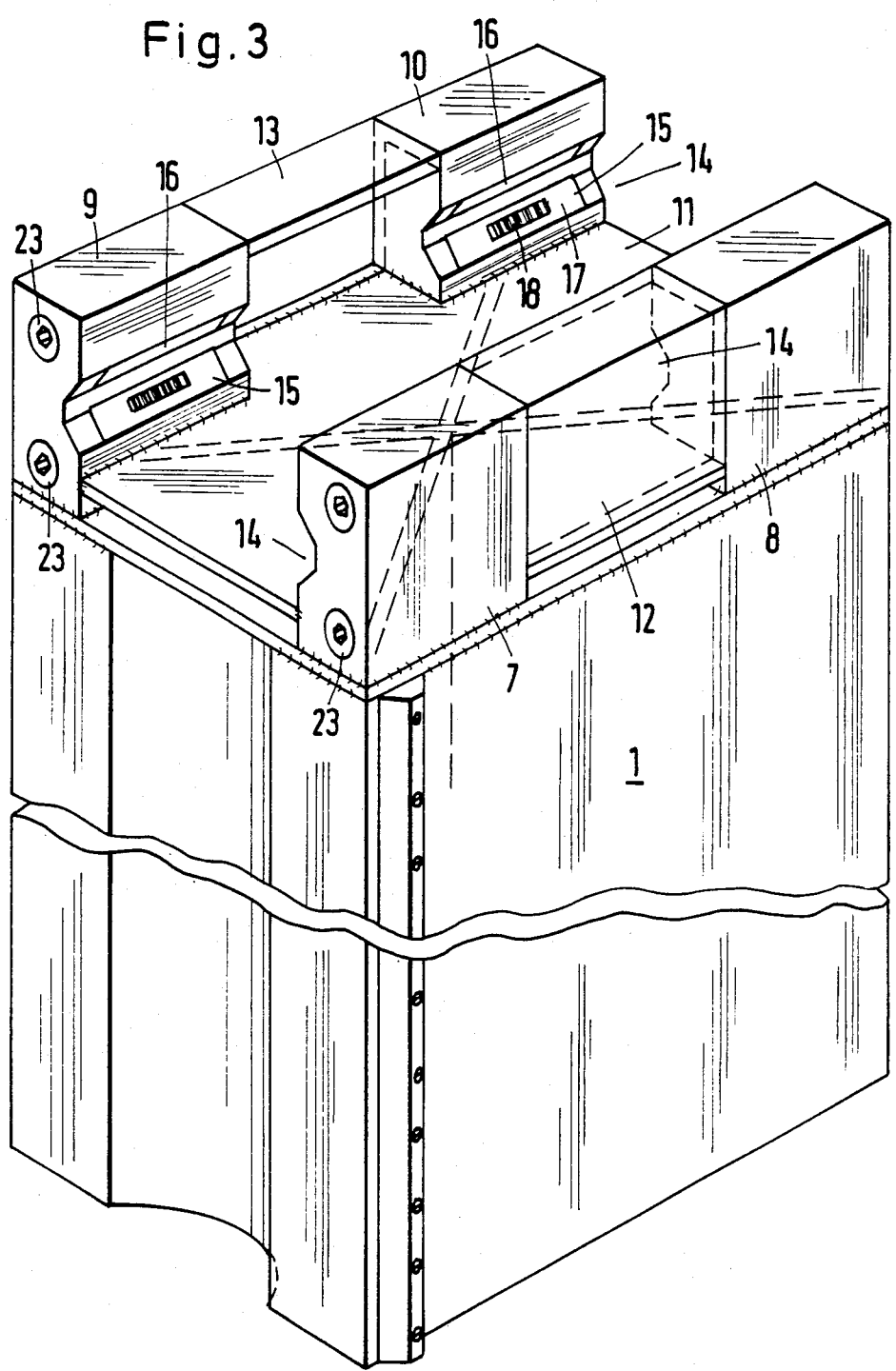
FIG. 3 shows a perspective view of the upper portion of the support with the guide stands welded thereon.
Figure 4:
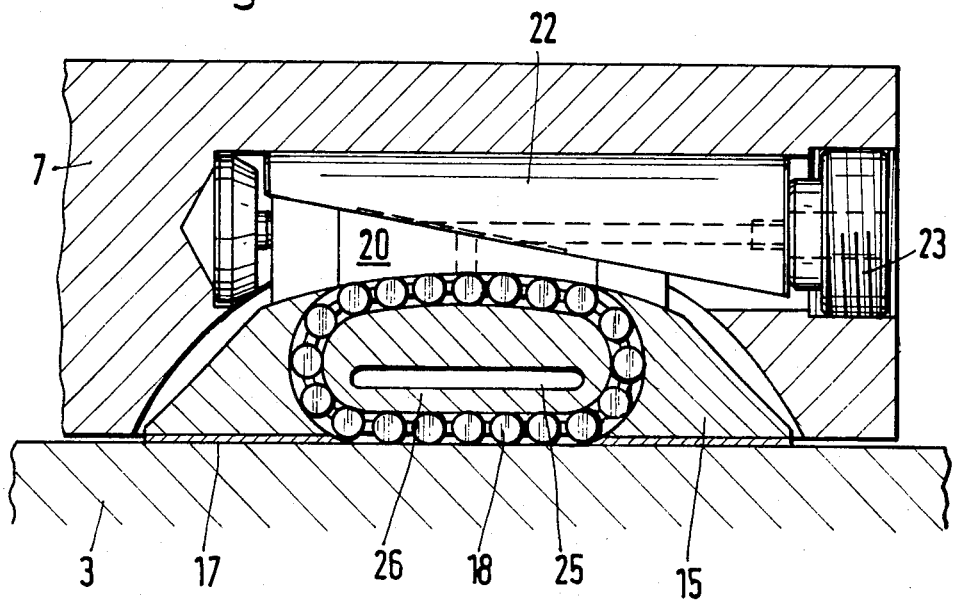
FIGS. 4 and 5 show two guide shoes in section.

The guide according to FIG. 4 differs from the guides according to FIGS. 1 to 3 only by a different construction of the guide shoe. In order to achieve a certain elastic support of the roller bodies 18 in the region of the active straight-line section of the closed roller body circulation track a recess 25 is formed inside the guide shoe 15. The cross-piece 26 remaining between this recess 25 and the straight section of the circulation track provides the desired resilient support of the roller bodies.

Figure 5:
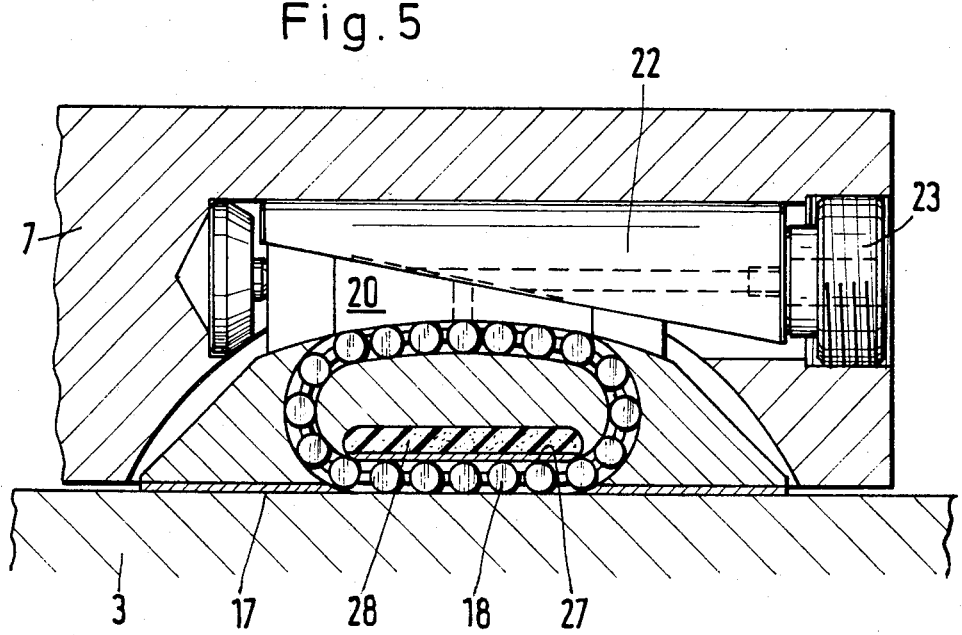

The embodiment according to FIG. 5 differs from that according to FIG. 4 only in that the recess 25 extends as far as the straight-line section of circulation track that is provided a support plate 27 for the roller bodies 18 in this section, the additional interior space of the recess being filled with an insert 28 made of a suitable material with the desired elastic properties.

The invention is not restricted to the embodiments shown. Thus guides and bearings for rotating machine parts, such as turntables, shafts and spindles, can also be constructed according to the concept according to the invention.

What is claimed is:

1. An adjustable guide for moving a moveable machine part relative to a fixed machine part, said adjustable guide comprising a guide rail attached to said moving machine part and having at least two finely machined guide surfaces, and a plurality of automatically adjusting guide shoes which form a portion of said fixed machine part, each of said guide shoes having an action surface formed of at least one sliding surface portion and a rolling surface portion, said rolling surface portion formed of a plurality of circulating roller bodies in a roller body circulation track, whereby each of said action surfaces forms a countersurface to one of said guide surfaces, and each of said guide shoes has a multiaxially acting prestressing and adjusting means which can be used to cause large adjustments in the positioning of said guide shoe while allowing minor automatic adjustments of said guide shoes to occur, thereby keeping said action surfaces and guide surfaces contiguous.

2. An adjustable guide according to claim 1 wherein said guide rail has a trapezoidal cross section and said adjustable guide is characterized in that said action surfaces are arranged in at least two stands which are rigidly fixed to said fixed machine part, each of said stands having a cutout therein with a trapezodial cross section that corresponds to the shape of said guide rail, and whereby two of said action surfaces form the two non-parallel sides of said trapezoidal-shaped cutout.

3. An adjustable guide according to claims 1 or 2 wherein said moving machine part is a rotatable about a central axis, whereby said adjustable guide is characterized in that said guide rail comprises annular, finely machined guide surfaces formed in circles about said axis, and a plurality of said automatic adjusting guide shoes fixed to said fixed machine part are arranged about said axis in a circular pattern so they are contiguous to said guide surfaces of said guide rail.

4. An adjustable guide according to any of claims 1 or 2 characterized in that each of said roller body circulation tracks in each guide shoe comprises a straight line section with an elastic member against which said roller bodies are supported.

5. An adjustable guide according to claim 4 further comprises a recess which extends parallel to said straight line section and is located inside said guide shoe.

* * * * *